A. L. SCHULTZ.
RESILIENT WHEEL.
APPLICATION FILED FEB. 11, 1920.

1,415,486.

Patented May 9, 1922.
3 SHEETS—SHEET 1.

Witness:
R. L. Tarrington.

Inventor,
Albert L. Schultz
By Albert Scheible, Atty.

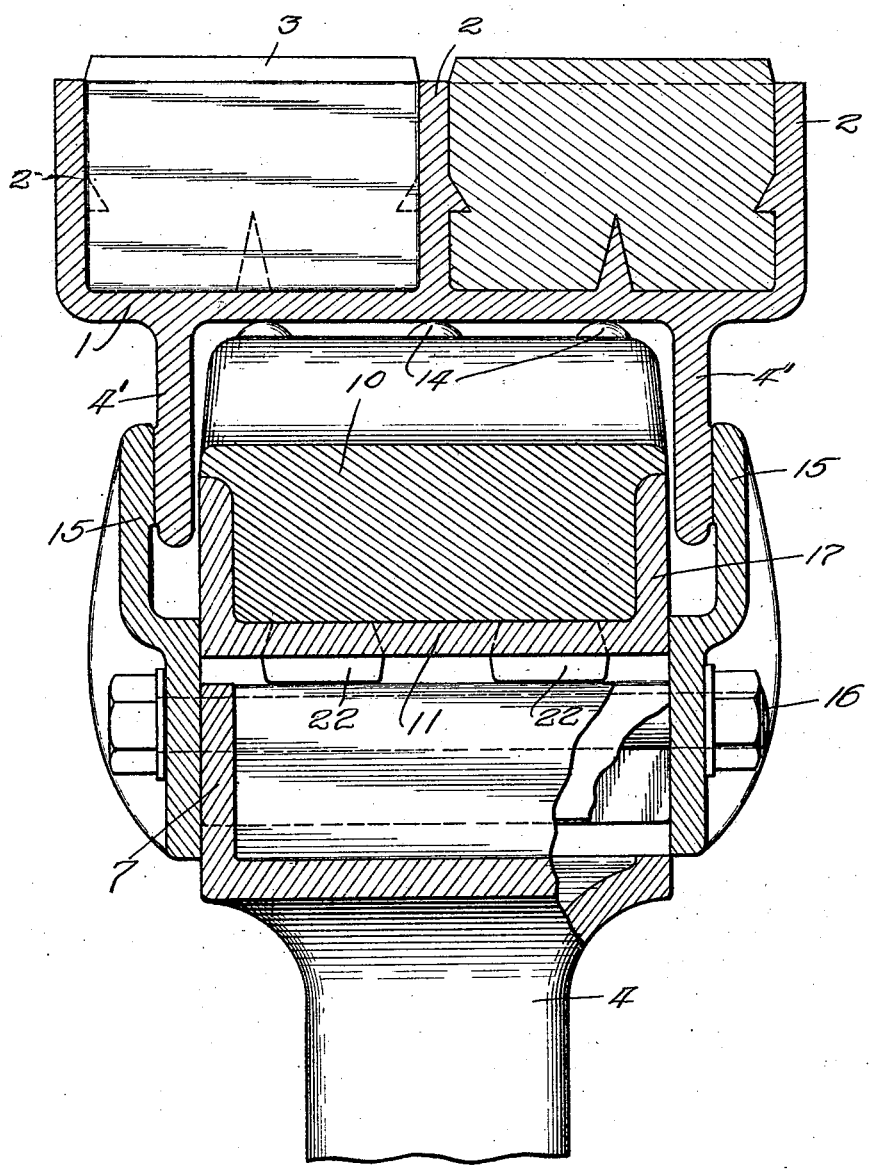

A. L. SCHULTZ.
RESILIENT WHEEL.
APPLICATION FILED FEB. 11, 1920.
1,415,486.
Patented May 9, 1922.
3 SHEETS—SHEET 3.
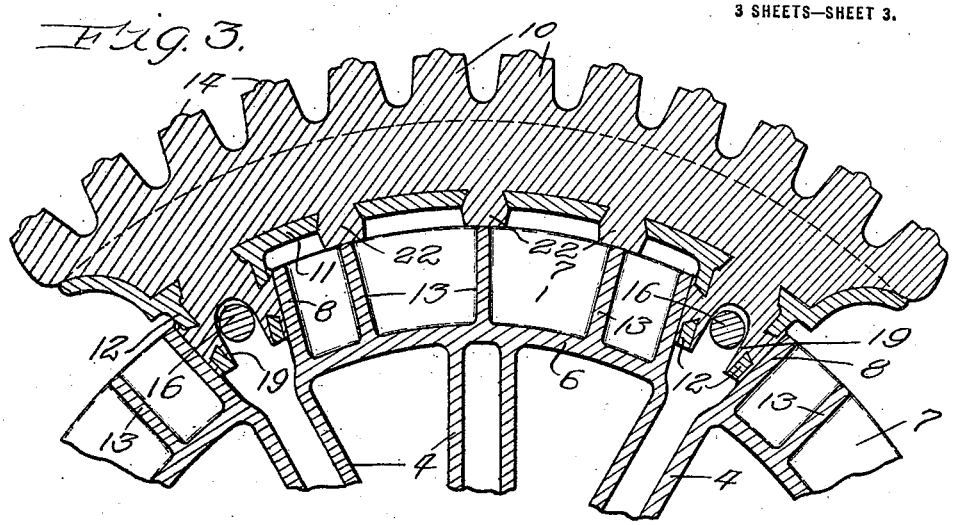
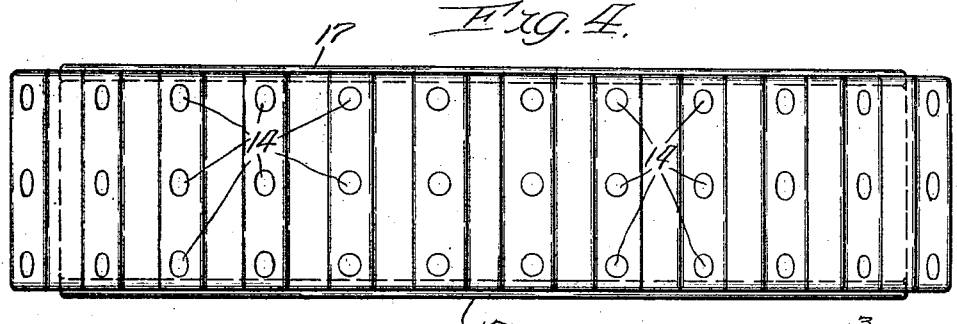
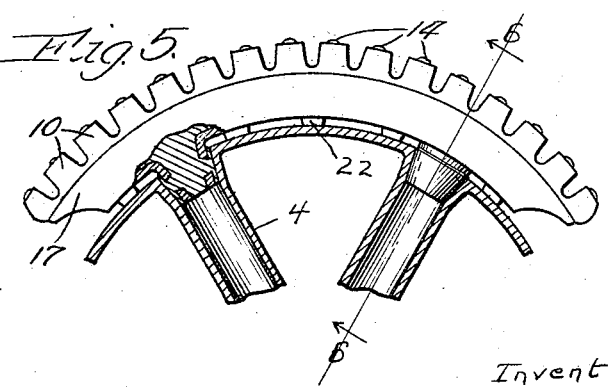
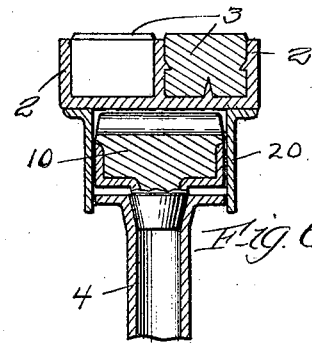
Inventor:
Albert L. Schultz
by Albert Scheible
Attorney

UNITED STATES PATENT OFFICE.

ALBERT L. SCHULTZ, OF PITTSBURGH, PENNSYLVANIA.

RESILIENT WHEEL.

1,415,486.    Specification of Letters Patent.    Patented May 9, 1922.

Application filed February 11, 1920. Serial No. 357,982.

*To all whom it may concern:*

Be it known that I, ALBERT L. SCHULTZ, a citizen of the United States, residing at Pittsburgh, in the county of Allegheny and State of Pennsylvania, have invented certain new and useful Improvements in a Resilient Wheel; and I do hereby declare the following to be a full, clear, and exact description of the invention, such as will enable others skilled in the art to which it appertains to make and use the same.

My invention relates to resilient wheels of the general type employing rubber cushions arranged in annular formation between the inner and outer rims of the wheel, and in some of its general aspects aims to provide a wheel construction which can readily be made to provide a predetermined resiliency proportioned to the work to be performed; which will effectively exercise a high driving torque without cramping the cushions or causing a braking action between different wheel parts; which will permit an easy alining and assembling of the various parts; which will be noiseless, and in which no special fastening members will be required for holding the cushioning members in operative position.

In one aspect, my invention relates to vehicle wheels in which the rubber cushions are mounted on carriers interlocked with the spokes of the wheel and in engagement radially of the wheel with the inner face of the outer rim or tread member of the wheel. In wheels of this class, it has heretofore been customary to secure the cushion carriers to the spoke member of the wheel by means of separate fastening members subjected to strains when the wheel is in operation, thus making the effective operation of the wheel dependent to a considerable extent on the location of these fastenings and on the extent of movement of the cushion carriers about the latter.

My invention aims to provide a construction in which the cushion members transmit the driving thrust without being subjected to a rocking movement and without imposing strains on any bolts or similar fastening elements, thereby avoiding both the friction and wear on such fastening elements and the undesirable effects due to the use of rockingly mounted cushioning members.

In another aspect, my invention aims to provide a wheel construction in which the cushioning members in an unloaded portion of the wheel may expand to the full extent afforded by their resiliency, while still maintaining sufficient engagement with the outer rim to avoid radial or lateral movement of the cushions. For this purpose, my invention aims to provide cushioning members with portions adapted to maintain continuous contact with adjacent rim parts of the wheel, while not interfering with the application of pressure to far larger portions of the cushioning members when these move on to the load-carrying positions.

In a further aspect of my invention, I aim to provide cushion carriers which will utilize the full radial distance between the inner and outer rims of the wheel for the cushioning, and to provide a method of mounting these cushion carriers which will minimize the proportion of each cushion through which the driving thrust is transmitted, and to arrange the cushions so as to eliminate noise. More particularly, my invention aims to provide cushion carriers so arranged that the driving thrust in opposite directions will be transmitted through relatively short end portions of the cushion on the carrier, and preferably to mount these carriers so that such thrusts will be transmitted direct by them to the spokes of the wheel. Moreover, my invention aims to provide simple means for assembling the cushion carriers and the hub member of the wheel in operative relation to each other, and to provide an assembly for this purpose which will permit the cushion carriers to adjust themselves automatically to variations in the fit between them and the hub member of the wheel. Still further and more detailed objects will appear from the following specification and from the accompanying drawings, in which—

Fig. 2 is an enlarged transverse section through the wheel taken along the line 2—2 of Fig. 1.

Fig. 3 is a fragmentary section taken along the medial plane of the wheel and showing one of the cushioning members and an adjacent portion of the hub member of the wheel.

Fig. 4 is a plan view of the parts shown in Fig. 3.

Fig. 5 is a fragmentary medial section through a wheel embodying my invention, in which the cushion carriers have frustoconical stems socketed in correspondingly flared spoke ends.

Fig. 6 is a fragmentary transverse section through the rim parts of the wheel of Fig. 5.

Figure 1:
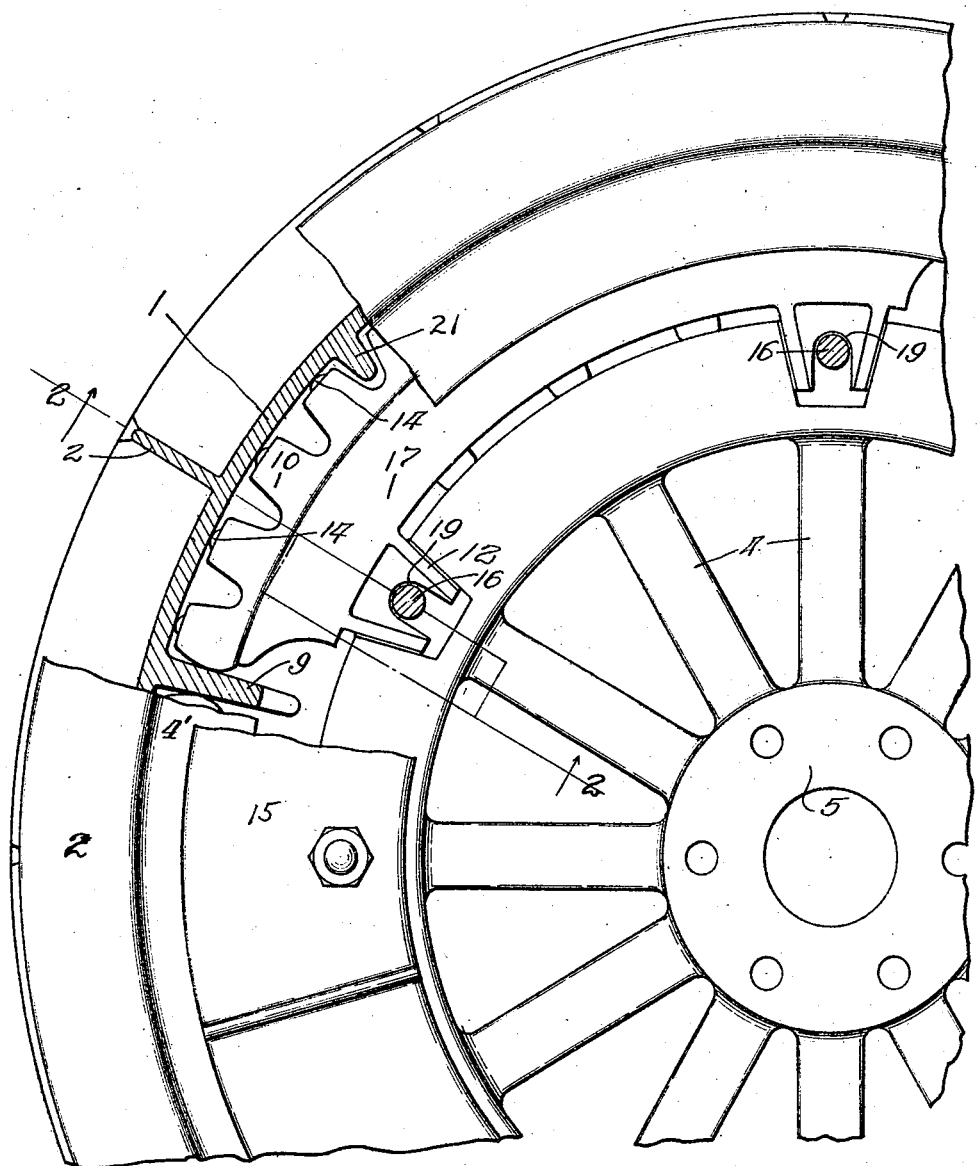
Fig. 1 is a fragmentary side elevation of my invention, with portions broken away to show the arrangement of the cushions and the tread blocks.

In the drawings, my invention is shown as embodied in a wheel of heavy steel construction, for which general type of wheel my invention is well suited, though I wish it understood that this is only one of many types of wheels in which my invention might be embodied. The wheel as illustrated has an outer rim member, desirably made of cast steel, and including a peripheral rim 1 carrying outwardly directed webs 2 affording pockets for socketing wooden tread blocks 3. Extending radially inward from the cylindrical rim 1 are a pair of side flanges 4' which co-operate with the intermediate portion of the rim 1 in affording part of the annular chamber in which the inner cushioning means of the wheel are disposed and by which they are housed against mud and other deteriorating influences.

The hub member of the wheel includes spokes 4 radiating from a hub 5 and connected at their outer ends by a cylindrical inner rim 6. Extending radially outward from this rim 6 are a pair of side flanges 7, which flanges are spaced closer to each other than the corresponding side flanges 4' of the outer rim member of the wheel. The hub member also includes a plurality of webs extending transversely of the wheel between the flanges 7, and these transverse webs desirably include webs 8 disposed in pairs forming the outer ends of the spokes, and the portion of the rim 7 between each pair of these webs 8 is cut away, so that each pair of these webs affords a trough or groove extending across the periphery of the hub member of the wheel. Moreover, the adjacent webs 8 which form the walls of such consecutive troughs or grooves converge radially inward of the wheel towards each other, as indicated in Fig. 3, for the purpose hereafter described.

The outer rim member of the wheel also has a series of equidistantly spaced webs 9 projecting radially inward from the cylindrical rim portion 1 and dividing the annular chamber between the side flanges 4' into a series of pockets all opening towards the center of the wheel. Each of these pockets houses one of the cushioning members of the wheel, and each such cushioning member desirably consists of a rubber cushion 10 molded upon and reinforced by a metal carrier. This metal carrier desirably has a base 11 equipped with perforations spaced from each other longitudinally of this base so as to permit portions 22 of the rubber to extend beyond this base radially inward of the wheel and into engagement respectively with webs 13 extending across the outwardly open pockets on the inner rim member, each of which pockets is bordered by a pair of groove webs 8 and the intervening parts of the two side flanges 7. Each carrier plate also has side flanges 17 to hold the rubber cushion in position and also has integral therewith a pair of extensions projecting radially inward of the wheel from the base 11 of the carrier and adapted respectively to enter two of the said transverse grooves or socket formations in the rim of the hub member of the wheel. These extensions or stems desirably each consist of a pair of webs 12 corresponding in length to the length of the said grooves, and these webs are freely spaced from each other and inclined with respect to each other to correspond to the inclination of opposite sides of one of these grooves and these webs 12 desirably are coated on their outer faces with rubber united to the part between the webs through perforations in the latter.

With the parts arranged as described, it will be obvious from the drawings that the hub member of the wheel and each of the cushioning members can readily be slid into their normal relative positions of Fig. 3 by a movement transverse of the wheel, and that when these wheel parts are alined with each other along the medial plane of the wheel, the side flanges 15 can be bolted in place and will then retain the cushioning members in position. The resilient portion proper of each cushioning member is desirably made of solid rubber and desirably has its radially outward portion composed of teeth spaced sufficiently from each other to permit independent flexibility and expansion circumferentially of the wheel. The rim 1 has projections 21 extending inwardly therefrom and engaged in the space between adjacent teeth of the cushions 10 so as to limit movement of the rim 1 with relation to the cushions. Moreover, each of these rubber cushion parts desirably is molded slightly longer circumferentially of the wheel than the space between two of the consecutive webs 9 on the outer rim member, which webs form the driving dogs on the outer wheel portion. Consequently, in inserting the cushioning member into one of the inwardly open pockets between consecutive webs 9, the cushion is somewhat compressed longitudinally, thereby maintaining both ends of the same in engagement with consecutive driving dogs 9. The height of each of the cushioning members desirably is normally somewhat greater than the distance between the base 11 of the carrier and the outer rim portion 1 when the inner and outer wheel parts are concentric, so that the cushion will normally be compressed radially of the wheel and the main end portions of the teeth (which desirably form parts of a single cylindrical surface) will normally have their entire surfaces in engagement with the inner face of the rim 1 in all parts of the wheel. However, when the wheel is loaded, the downward movement of the hub member will compress the lower cushions and will carry the center of the hub member below the center of the rim member, thereby tending to lower the teeth on the upper cushioning members entirely out of contact with adjacent portions of the rim 1, unless the cushions were initially under such a high compression radially of the wheel as might reduce the available resiliency. To avoid the necessity for such a degree of compression, while also avoiding the possibility of having the cushions move entirely out of contact with the tread rim band 1 and thereby causing a noisy and wearing action, I desirably equip each tooth of the rubber cushions with a plurality of nubs or projections 14 extending radially outward of the wheel beyond the end of the tooth proper. Thus, Figs. 3 and 4 show each tooth as having three such nubs, all relatively small with respect to the end of the tooth carrying the same, so that the resiliency of the tooth will readily permit these projections to be pressed down substantially flat or into alinement with the end of the tooth.

With the cushions thus equipped, I can readily plan the size of the parts so that when the wheel is heavily loaded, the upper cushions will contact with the outer rim member of the wheel only through the driving dogs 9 and through the nubs 14, as shown in the drawings. Then, as the wheel revolves, each formerly upper cushion gradually has a radially inward strain applied to it, which strain first presses the nubs 14 out of their protruding disposition and thereafter exerts a further compression radially inward of the wheel through the entire end of each tooth. This pressure is transmitted to the hub member of the wheel partly through the carrier base 11 and the projections 12 on the latter, and partly through the portions 22 of the rubber cushion which extend through the perforations of the carrier base into engagement with the stiffening webs 13. By thus distributing the transmitting of the strain over the greater part of the length of each cushioning member, I avoid any tendency towards rocking the latter and consequently avoid the cramping strains or braking action which has proven so serious in older wheel constructions.

Furthermore, it will be obvious from the drawings that the socketed projections 12 are relatively close to the ends of the cushioning member, so that the driving strains in each direction can be transmitted through a relatively short portion of the cushion. That is to say, if the wheel of Fig. 1 is started from rest in a clockwise direction, the driving torque will be transmitted from the driving dog 9 to the carrier projections 12 socketed in the adjacent peripheral groove of the hub member of the wheel. Likewise, it will be seen from the right hand of Fig. 3, that a movement in the reverse direction will be transmitted through a correspondingly short right-hand end portion of the cushion. In either case, the driving strain is transmitted at such an oblique angle to the adjacent portion of the rim 1 and through such a short portion of the cushion proper, that this driving strain will not tend to slide the cushions circumferentially of the wheel. Consequently, I avoid the friction heretofore encountered in inner-cushioned wheels in which the driving torque had to be transmitted through the entire length of the cushions, or at least through a large portion of this length, and thereby avoid both the resulting heating effect and the wear on the associated parts. I am therefore able to reduce the amount of distortion to which the cushions are subjected, thereby utilizing the resiliency more effectively, reducing the power consumed in the driving and increasing the life of the cushions.

To prevent a relative lateral movement of the inner and outer wheel parts, I provide auxiliary side flanges 15 secured to the hub member of the wheel at opposite sides of the latter and slidably engaging the outer faces of the flanges 4' on the outer or tread rim portion of the wheel. These side flanges desirably have annular portions projecting towards and engaging each other as shown in Fig. 2. The auxiliary flanges 15 are here shown as simultaneously secured in position by bolts 16, which bolts desirably extend along the center lines of the peripheral notches in which the projections 12 are socketed, and which bolts extend through alined bores in the flanges 7 and through bores in the socketed portions 19 of the rubber cushions, which bores in the rubber parts are sufficiently large to permit freedom of movement for the bolt, and to avoid any shear or binding strain from any cause.

In assembling the wheel as illustrated, the cushioning members are first slipped into the inwardly directed pockets in the outer rim member (which may be done either before or after the tread blocks 3 are attached to the outer rim) so that these cushioning members will be disposed in annular formation within the tread rim member of the wheel. Then the cushioning members are all forced somewhat radially outward of the wheel by clamps affixed to the tread rim, thereby compressing these cushioning members and bringing the tips of the projections 12 to the desired spacing from the axis of the wheel, corresponding to the peripheral notches in the hub member of the wheel. When this has been done, the hub member (with at least one of the auxiliary flanges 15 left off the same) can be inserted within the aforesaid wheel formation by a movement along the axis thereof, after which the other or both of the auxiliary flanges 15 are bolted in position. With the wheel thus assembled, the auxiliary flanges 15 take care of the side strains and hold the inner and outer wheel portions in proper alinement against such side strains, hold the flanges 4' out of contact with the side portions 17 of the carrier 11, and effectively seal the annular chamber in which the cushions are disposed. Consequently, the entire assembly is easily effected, and the number of bolts required is only that needed for securing the auxiliary side flanges in position. Likewise, by removing the bolts 16, the wheel parts can readily be separated for inspection if this should be desired.

The auxiliary flanges 15 are desirably machined to afford a sliding fit against the flanges on the outer rim, thereby completely sealing the annular cushion chamber against mud and atmospheric conditions which would tend to deteriorate the rubber in the cushions. This side flange arrangement also resists lateral strains, while the socketing of the stems of the cushioning members also aids in absorbing lateral shocks and hence prevents crystallization of the metal parts.

However, while I have illustrated and described my invention in a certain desirable embodiment, I do not wish to be limited to the details of construction and arrangement thus disclosed, it being obvious that the same might be varied in many ways without departing from the spirit of my invention as disclosed in the appended claims. For example, instead of sliding the stems on the cushion carriers transversely of the wheel into socketing grooves on the hub member, I may make these stems in a frusto-conical form and may socket them in correspondingly shaped spoke ends as shown in Fig. 5. In that case, the cushioning members would be socketed in engagement with the hub member first, and the resulting aggregation of parts would then be forced sideways into the outer rim member with one of the side flanges 20 detached from the latter, after which this side flange would be secured in position as shown in Fig. 6. In either case, the reinforcing base of the metal carrier is preferably much closer to the inner rim than to the outer rim, so as to reduce the amount of metal required and to use this more effectively in applying the driving torque in either direction. Moreover, the cushion is desirably secured to the reinforcing base or carrier both mechanically and chemically; that is to say, both by being interlocked through openings in the carrier and by being vulcanized upon the latter.

I claim as my invention:

1. As intermediaries between the inner and outer rim members of a resilient wheel in which the inner rim member has outwardly flaring socket formations, cushioning members each comprising a substantially integral cushion in direct contact with both rims and with the socket formations, and a metal reinforcement imbedded in the cushion and having portions conformably extending into the socket formations but kept from direct contact with the latter by parts of the cushion.

2. A resilient wheel comprising an outer rim having inwardly directed driving dogs, a hub member having outwardly directed socket formations, and cushioning means interposed between the said members; the cushioning means comprising rigid elements having perforated stems conformably fitted in the said socket formations, and cushions carried by the rigid elements and extending through the perforations of the stems into direct contact with the socket formations.

3. A resilient wheel comprising an outer rim having inwardly directed driving dogs, a hub member having outwardly directed socket formations, and cushioning means interposed between the said members; each of the cushioning means comprising a rigid element having stems conformably fitted in certain of the said socket formations, and a cushion carried by the rigid element, the rigid element having perforations between the stems through which the cushion projects into direct contact with the walls of certain other sockets of the hub member.

4. A resilient wheel comprising an outer rim having inwardly directed driving dogs, a hub member having outwardly directed socket formations, and cushioning means interposed between the said members; each of the cushioning means comprising a rigid element having stems socketed in the said socket formations; and a cushion carried by the rigid element and projecting through openings in the latter into direct contact both with the socket formations and with intermediate portions of the hub member.

5. In a resilient wheel, an inner and an outer rim, spokes carrying the inner rim and having their outer ends hollow and opening through the inner rim, cushioning members disposed in annular formation between the rims and each having a pair of stems respectively and conformably socketed in the hollow end portions of two spokes, driving dogs on the outer rim extending radially inward therefrom between consecutive cushioning members, each of the said cushioning members normally engaging the inner face of the outer rim and the opposed faces of two of the driving dogs.

6. In a resilient wheel as per claim 5, side flanges on the inner and outer rims cooperating to restrict relative lateral movement of the said rims, and fastening means coacting in securing the side flanges to the inner rim and in holding the cushioning members on the inner rim.

7. In a resilient wheel, an inner rim having spaced radial webs forming pockets, carriers arranged about the rim and having spaced parts extending into pockets adjacent thereto, and a cushion borne by each carrier and having parts extending beneath the carrier and engaged with the outer edges of certain of the webs in the space between said spaced parts to hold the carrier spaced from the webs.

8. In a resilient wheel, an inner rim having spaced radial webs forming pockets, carriers arranged about the rim and having spaced parts extending into pockets adjacent thereto, and a cushion borne by each carrier and having parts extending beneath the carrier and engaged with the outer edges of certain of the webs in the space between said spaced parts to hold the carrier spaced from the webs, said parts being perforated and portions of the cushions extending through the perforations and into direct contact with the faces of the webs forming the pockets.

9. In a resilient wheel, an inner rim having spokes with sockets, carriers arranged about the rim and each having metal perforated bases and perforated extensions the latter extending into the sockets in spaced relation to the walls thereof, and cushions borne by the carriers and having parts extending through the perforations of the bases to seat on the rim at points between the extensions and having parts extending through the perforations of the extensions to closely fit the walls of the sockets.

10. In a resilient wheel, an inner rim having socketed parts, carriers arranged about the rim and having rigid projections conformably and closely fitted in the sockets, and cushions on the carriers having parts extending through the carriers and engaged with the inner rim at points between the socketed parts thereof.

Signed at Pittsburgh, Pennsylvania, February 7th, 1920.

ALBERT L. SCHULTZ.